Figure 1:
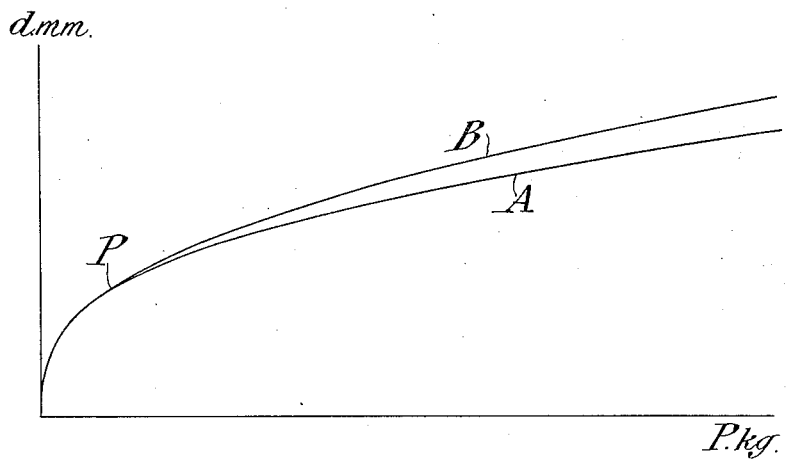

N. A. PALMGREN.
METHOD OF DETERMINING THE PRESSURE BETWEEN TWO BODIES.
APPLICATION FILED NOV. 27, 1918.

1,312,805.
Patented Aug. 12, 1919.

INVENTOR:
Nils Arvid Palmgren,
BY
Fraser, Dunk & Myers
ATTORNEYS.

UNITED STATES PATENT OFFICE.

NILS ARVID PALMGREN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

METHOD OF DETERMINING THE PRESSURE BETWEEN TWO BODIES.

1,312,805. Specification of Letters Patent. Patented Aug. 12, 1919.

Application filed November 27, 1918. Serial No. 264,480.

*To all whom it may concern:*

Be it known that I, NILS ARVID PALMGREN, a subject of the King of Sweden, residing at Gottenborg, in the Kingdom of Sweden, have invented a new and useful Improvement in Methods of Determining the Pressure Between Two Bodies, of which the following is a specification.

The present invention relates to a method of determining the pressure between two contacting bodies having relatively curved surfaces, *i. e.*, both having curved surfaces, or one having a curved surface and the other having a plane surface. The invention is based on the fact that the amount of the temporary deformation always has a certain definite relation to the pressure applied.

If, for instance, two balls are being pressed against one another, the surface of contact between the balls becoming circular, the following relation applies, according to Hertz, provided that the limit of proportionality is not exceeded:

$$p = 1.11 \sqrt[3]{\frac{P}{E} \cdot \frac{r \cdot r_1}{r + r_1}},$$

where $p$ is the radius of the said contact surface, $P$ is the pressure between the balls, $E$ is the modulus of elasticity of the material of the balls, and $r$ and $r_1$ are the radii of the balls. Thus, for a certain material and certain radii of the balls, $$p = k \sqrt[3]{P},$$

that is to say, the size of the contact surface between the balls depends exclusively on the pressure applied. The said pressure may thus be determined if it is possible in one manner or other to measure the dimensions of the contact surface.

Hertz used at his experiments bodies of transparent material, so that the dimensions of the contact surface might be directly observed and measured. This method is, of course, very limited in its use.

A further method previously used consists in introducing from two opposite sides thin sheets of paper or the like between the balls so that the edges of said sheets of paper form tangents to the circle bounding the contact surface, and in measuring the distance between said edges, the dimension of the diameter of the said circle thus being obtained. It is readily understood, however, that such a method gives only approximate values of the diameter of the contact surface, owing to it being difficult to make the edges of the paper sheets contact with the circumference of the contact surface and on account of it being impossible to determine accurately when such contact takes place.

Still a further method, also previously known, of determining the pressure between two balls, consists in producing a permanent deformation which may be measured when the pressure between the balls has been removed. With this method, however, the limit of proportionality of the material must be exceeded, and for this very reason the method is not very feasible in practice. The method is also exceedingly unreliable, there being caused, in addition to the permanent deformation, also an elastic deformation at the edges of the contact surface, which elastic deformation can not be determined according to the said method.

Above it has been assumed that the pressure between two spherical bodies is to be determined. If it is desired to determine the pressure between two bodies having another curved shape, as for instance, between the balls and the tracks of a ball bearing, the methods above referred to are in most cases unfeasible in practice.

The present invention relates to a method of determining exactly the shape and the size of the contact surface between any two curved bodies forced against one another, or between a body having a curved surface and a body having a plane surface, whereby the pressure between the bodies may thus also be determined. When the dimensions of the contact surface have been determined, it is a matter of no importance to the present invention whether some known formula is used for ascertaining the pressure, or whether, beforehand, there is produced empirically an image of the relation between the dimensions of the contact surface and the pressure.

According to the present invention there is produced a permanent image of the elastic deformation caused by the pressure at the place of contact between the bodies. This is attained, according to the invention, when the pressure has been applied to the bodies, by subjecting the portions of the bodies surrounding the contact surface to the influence of an etching liquid or an etching gas capable of attacking the material, the etching liquid or gas being carefully removed from the bodies after a suitable time, after which the pressure is removed. The dimensions of the surface not touched by the etching liquid or gas are afterward measured, the said surface being exactly equal to the elastic deformation of the bodies at the place of contact, and the pressure is determined in the manner previously referred to.

The method is particularly useful for determining the pressure between the balls and the tracks of a ball bearing, and it may advantageously be made a step of the manufacture of such bearings, it being possible according to the present method accurately to determine the quality and the hardness of the material of the balls and races so that the fixed limits of permissible stresses are not exceeded.

Over the methods previously used the method according to the present invention also entails the essential advantage that it is independent of the arrangement of the bodies, that is to say, that the method is applicable also, for instance, to bearings mounted in the most complicated manner, such as for instance bearings for railway cars and the like, where a direct observation is completely excluded.

Figure 2:
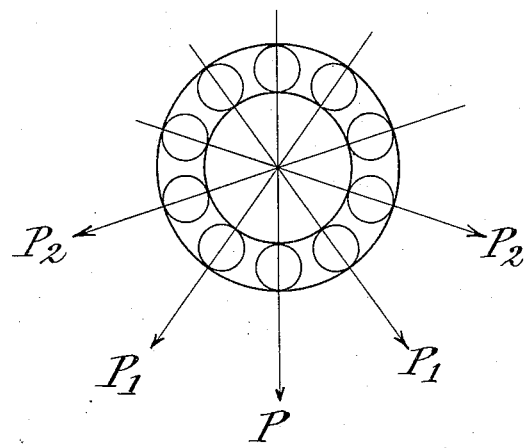

The invention is illustrated diagrammatically in the accompanying drawing. Figure 1 shows two curves illustrating the relation between the pressure and the diameter of the circular contact surface between the balls and the outer race of a spherical ball bearing of certain dimensions. Fig. 2 shows diagrammatically the distribution of the load in a radial ball bearing.

Referring to Fig. 1, the curve A represents the relation between the pressure and the diameter of the circular contact surface between the balls and the outer race of a spherical ball bearing in which the diameter of the spherical track is 86.80 mm. and the ball diameter is $\frac{1}{2}''$. The diameter of the contact surface has been determined by etching the portions surrounding said contact surface, and the pressure has been determined according to Hertz's formula referred to above, which with the assumed dimensions of the track and of the balls will become $$d = 0.156 \sqrt[3]{P},$$

in which $d$ is the diameter of the contact surface in millimeters, and $P$ is the pressure in kilograms, as before. The curve B is obtained empirically by determining, according to the invention, the diameter $d$ of the contact surface for known pressures P. As shown in Fig. 1, the two curves A and B practically coincide up to the point $p$ corresponding to the limit of proportionality of the material under the conditions at hand, the reliability of the method according to the present invention thus being demonstrated.

If it is desired to apply the method for instance to the radial ball bearing shown in Fig. 2 for determining the pressure between the tracks and the balls under load, it is suitable first to put the bearing into rotation under load and afterward to bring it to rest, when it may be assumed that the conditions of load on the balls are similar to those when the bearing is running. The balls are then treated in the manner above described by means of an etching liquid or an etching gas which liquid or gas is carefully removed after a few minutes, the etching liquid by means of any suitable liquid not influencing the balls and the etching gas by means of an abundant supply of air. The load on the ball bearing is then removed and the balls are taken out of the bearing. The diameter of the surfaces of the balls not touched by the etching liquid or etching gas is then measured, preferably by microscopic examination, whereupon the pressures $P$, $P_1$, and $P_2$ to which the separate balls have been subjected, may be determined in any manner as above described.

A suitable etching liquid for bodies of iron and steel may be prepared in the following manner:

2.5 gr. chlorid of bismuth ($BiCl_3$) are dissolved in 10 cm³ hydrochloric acid (HCl). 5 gr. mercuric chlorid ($HgCl_2$) are dissolved in 100 cm³ water while boiling. To this latter solution 2 gr. cupric chlorid ($CuCl_2$) is added. The solution of mercuric chlorid and cupric chlorid is then added, while stirring, to the solution of chlorid of bismuth. Finally, 10 cm³ alcohol is added.

Chlorin (Cl) may be mentioned as an instance of a suitable etching gas.

As stated above the present method may also be applied for determining the pressure between bodies having other than spherical shape. In cases where the relation between the pressure and the deformation can not be determined mathematically it is possible by using known pressures to begin with, empirically to produce the desired relation.

I claim:

1. The method of determining the pressure between two bodies having relatively curved surfaces, normally in tangential contact, which consists in applying pressure to the bodies to transform their tangent contact to surface contact, subjecting the portions of the bodies surrounding the surface of contact to the influence of an etching agent capable of attacking the material of the body, removing said etching agent after a suitable period of time, removing the pressure applied to the bodies, and measuring the dimensions of the surface of contact of the bodies not touched by the etching agent, whereby to determine therefrom the pressure producing the deformation.

2. The method of determining the pressure between two bodies having relatively curved contacting surfaces which are normally tangential which consists in applying pressure to the bodies to transform their tangent contact to surface contact and subjecting the portions of the bodies surrounding the surface of contact to an agent capable of indicating the margin of such surface of contact, and subsequently removing the pressure applied to the bodies, and measuring the dimensions of the surface of contact of the bodies, whereby to determine therefrom the pressure applied to said bodies.

NILS ARVID PALMGREN.